(12) United States Patent
Appleyard

(10) Patent No.: US 11,708,887 B2
(45) Date of Patent: Jul. 25, 2023

(54) GEARBOX ASSEMBLY

(71) Applicant: TRW Limited, Solihull (GB)

(72) Inventor: Michael Appleyard, Cheltenham (GB)

(73) Assignee: ZF Automotive UK Limited

( * ) Notice: Subject to any disclaimer, the term of this patent is extended or adjusted under 35 U.S.C. 154(b) by 666 days.

(21) Appl. No.: 16/624,377

(22) PCT Filed: Jun. 29, 2018

(86) PCT No.: PCT/GB2018/051843
§ 371 (c)(1),
(2) Date: Dec. 19, 2019

(87) PCT Pub. No.: WO2019/002888
PCT Pub. Date: Jan. 3, 2019

(65) Prior Publication Data
US 2020/0217411 A1     Jul. 9, 2020

(30) Foreign Application Priority Data
Jun. 29, 2017    (GB) ..................................... 1710388

(51) Int. Cl.
*B62D 5/04*      (2006.01)
*F16H 57/028*    (2012.01)
(Continued)

(52) U.S. Cl.
CPC ......... *F16H 57/039* (2013.01); *B62D 5/0403* (2013.01); *B62D 5/0409* (2013.01);
(Continued)

(58) Field of Classification Search
CPC ................. F16H 57/039; F16H 57/028; F16H 2057/02034; F16H 2057/02082;
(Continued)

(56) References Cited

U.S. PATENT DOCUMENTS 3,848,477 A    11/1974   Giandinoto et al.
2005/0224278 A1   10/2005   Segawa

FOREIGN PATENT DOCUMENTS

EP         0584383 A1 *  3/1994
JP       2006103391 A     4/2006
(Continued)

*Primary Examiner* — T. Scott Fix
(74) *Attorney, Agent, or Firm* — Robert James Harwood

(57) ABSTRACT

A gearbox assembly for an electric power assisted steering apparatus includes a gearbox housing, a worm shaft, a main bearing assembly, and a first fulcrum means. The worm shaft may be supported relative to the housing by a main bearing assembly at an end closest to the motor. The main bearing assembly may include an inner ring defining an inner bearing race, an outer ring defining an outer bearing race, and a plurality of bearings that run between the two races. The first fulcrum means may be located on a first side of the main bearing assembly which reacts only the axial component of the wormshaft tooth load for a first direction of gearwheel torque. A second fulcrum means may be located on a second, opposing, side of the main bearing assembly, which reacts only the axial component of the wormshaft tooth load for the second direction of gearwheel torque.

20 Claims, 4 Drawing Sheets

(51) Int. Cl.
 *F16H 57/02* (2012.01)
 *F16H 57/021* (2012.01)
 *F16H 57/12* (2006.01)
 *F16H 57/039* (2012.01)

(52) U.S. Cl.
 CPC ... *F16H 57/028* (2013.01); *F16H 2057/0213* (2013.01); *F16H 2057/02034* (2013.01); *F16H 2057/02082* (2013.01); *F16H 2057/127* (2013.01)

(58) Field of Classification Search
 CPC ....... F16H 2057/0213; F16H 2057/127; F16H 2057/126; B62D 5/0403; B62D 5/0409
 USPC .......................................... 180/443; 700/121
 See application file for complete search history.

(56) References Cited

FOREIGN PATENT DOCUMENTS

| | | | | |
|---|---|---|---|---|
| JP | 2007196853 A | * | 8/2007 | |
| WO | WO-2008053226 A1 | * | 5/2008 | ........... B62D 5/0409 |
| WO | 2016151305 A | | 9/2016 | |
| WO | 2016151306 A1 | | 9/2016 | |

* cited by examiner

SECTIONED VIEW
IN DIRECTION 'X'

SECTIONED VIEW IN
DIRECTION 'X'

GEARBOX ASSEMBLY

CROSS-REFERENCE TO RELATED APPLICATION

This application is a national stage of International Application No. PCT/GB2018/051843, filed Jun. 29, 2018, the disclosure of which is incorporated herein by reference in its entirety, and which claimed priority to UK Patent Application No. 1710388.8, filed Jun. 29, 2017, the disclosure of which is incorporated herein by reference in its entirety.

TECHNICAL FIELD

This invention relates to improvements in gearbox assemblies for an electric power assisted steering system, and to electric power assisted steering systems incorporating a gearbox.

BACKGROUND

Electric power steering systems use an electric motor to produce an assistance torque that is applied to a rotating part of the steering system. In a conventional arrangement this torque assists the driver in turning the wheel. Because motors work best at relatively high speeds and because compact motors produce relatively low torques, the connection between the output of the motor and the steering column is usually through a reduction gearbox.

The most widely used type of electric power assisted steering reduction gearboxes are of a relatively simple worm and gear configuration similar to that shown in FIG. 1 of the accompanying drawings The gearbox assembly 100 typically comprises a gearbox housing 101 which houses a worm shaft 102 and a gear wheel 103. The worm shaft is connected to the output of an electric motor 104 (shown in part at the far right). The motor may be secured to an end face of the housing or even located within the housing. The worm shaft is supported by a main bearing assembly 105 at an end closest to the motor and a tail bearing assembly 106 at an end furthest from the motor, both bearing assemblies typically comprising ball bearing elements supported within an inner bearing race that is threaded onto the worm shaft and an outer bearing race that is secured to the housing. The function of the bearings assemblies is to allow the worm shaft to rotate whilst to a certain degree limiting axial and radial movement as will be explained. The gear wheel is connected to an output shaft of the gearbox and located so that teeth of the gear wheel engage teeth of the worm shaft.

It is known that the speed reduction gearboxes used in electrical power-assisted steering (EPS) apparatus are prone to rattle due to external torsional vibrations acting at their output shafts. These vibrations originate at the road wheels due to surface roughness or unbalanced wheels. Alternatively, mechanical noise can arise from sudden torque reversals applied at the steering wheel by the driver. The main rattle sites in a worm and wheel gearbox are at the engagement of the worm and gear teeth and at the "main" ball bearing, closest to the motor, which axially locates the worm shaft.

A well-known solution to the rattle is the so-called "sprung worm" mechanism. In the "sprung worm" mechanism, a biasing means such as a leaf spring 107 applies a biasing force that urges the worm shaft into engagement with the wheel gear. The biasing means requires a small amount of radial movement of the worm shaft and this is achieved by allowing it to pivot around its axis in the plane of the gearwheel by a small angle (typically less than +/−1-0.5 degrees) either side of its nominal position around an axis which is nominally at the centre of the main bearing. This movement is controlled by a specially configured tail bearing that is allowed to move by small amounts (typically less than +/−0.5 mm) and typically by the main bearing having sufficient internal axial clearance between its balls and the sides of its race grooves to permit a small articulation (i.e. tilting) angle which is typically less than +/−0.5 degrees.

The support for the tail bearing can be provided in a number of ways. These typically involve the bearing being able to deform, or slide or roll relative to a fixed support connected to or forming a part of the housing. In the example as shown in FIG. 1 the outer race of the tail bearing is located by a plastic collar 108 supported by two pairs of compressible O-rings.

In the arrangement shown in FIG. 1, it is usually assumed that the inner race of the main bearing 105, and hence the wormshaft, pivots about an axis which passes through that bearing's centre and therefore lies on the axis of the wormshaft. This is actually not the ideal location for the pivot axis because the tooth contact occurs in a different plane; i.e. it occurs nominally where the pitch circle diameter (PCD) of the worm touches the PCD of the gearwheel and this is several millimetres below the main axis of the wormshaft. The tooth contact forces act in a direction which is perpendicular to the sloping tooth flank (see FIG. 2) but can be considered to have an "axial" component which is parallel to the wormshaft and a "normal" component which tries to push the worm and the gearwheel apart. There is also a third component which acts parallel to the gearwheel axis and is due to the so-called "helix" angle of the teeth. This helix angle is instrumental in determining the reduction ratio of the gearbox. The helix angle is not visible in the cross-section of FIG. 1 and the said third component of force is not directly relevant to this analysis of the gear rattle problem.

The fact that the pivot axis of the worm is nominally at the centre of the main bearing, and therefore does not pass through the tooth contact plane, means that the "axial" component of the gear tooth force (i.e. that which is parallel to the wormshaft axis) acting on the wormshaft imposes a tilting moment about the pivot axis. This moment is in addition to, or subtracts from, the moment generated by the normal component, depending on its direction.

The tilting moment due to the axial component reverses its direction when the torque being transmitted by the gearbox reverses whereas the pivoting moment due to the normal component does not. Therefore, for one direction of torque transmission, the overall tilting moment acting on the wormshaft is equal to the sum of those moments caused by the axial and normal components of the gear tooth forces, but is equal to their difference for the other direction of torque transmission. This results in some asymmetry in the behaviour of the gearbox with respect to the direction of the torque which it is transmitting. This asymmetry mainly reveals itself as differences in the friction losses when the same level of torque is transmitted in the two different directions.

SUMMARY

An object of the present invention is to ameliorate problems that have been identified by the applicant in prior art gearbox assemblies associated with the need to enable the tail end of the worm shaft to move radially.

According to a first aspect the invention provides a gearbox assembly for an electric power assisted steering apparatus comprising: a gearbox housing which houses a wormshaft carrying a worm gear and a gear wheel having a set of gearwheel teeth, the worm shaft being supported relative to the housing by a main bearing assembly at an end closest to the motor and by a tail bearing assembly at an end furthest from the motor, and the gear wheel being supported by an output shaft having at least one end that provides a take-off from the gearbox assembly, the main bearing assembly comprising an inner ring defining an inner bearing race, an outer ring defining an outer bearing race, and a plurality of bearings that run between the two races, the inner bearing race being fixed to the wormshaft such that it cannot move axially relative to the wormshaft, the assembly being arranged such that the wormshaft is capable of pivoting about an axis or axes proximate to the main bearing assembly so as to enable dual-sided tooth flank contact of the teeth of the worm with the gearwheel teeth to be achieved, further comprising a first fulcrum means located on a first side of the main bearing assembly which reacts only the axial component of the wormshaft tooth load for a first direction of gearwheel torque and a second fulcrum means located on a second, opposing, side of the main bearing assembly, which reacts only the axial component of the wormshaft tooth load for the second direction of gearwheel torque, the points of contact of the first and second fulcrums with the main bearing assembly defining an axis around which the main bearing assembly may pivot.

The first fulcrum means may comprise a pair of rigid elements each having an axis substantially parallel to the wormshaft axis and two opposed regions located at each end of the axes defining ends of the element, the elements being positioned substantially equidistant either side of the wormshaft axis in a common plane which is parallel with the axes of both the wormshaft and the gearwheel and where a first end of each element is resting against the gearbox housing or a component which is connected to the gearbox housing and the second end of each element is resting against the outer race of the first bearing assembly or against a component which is connected to the outer race of the first bearing assembly and where the first and second ends of each elements are able to tilt by a small angle relative to surfaces against which they are resting.

The second fulcrum means may similarly comprise a pair of elements having their axes substantially parallel to the wormshaft axis the elements being positioned substantially equidistant either side of the wormshaft axis in a common plane which is parallel with the axes of both the wormshaft and the gearwheel and a first end of each element is resting against the gearbox housing or a component which is connected to the gearbox housing and the second end of each element is resting against the outer ring of the first bearing or against a component which is connected to the outer ring of the first bearing and where the first and second ends of each element are able to tilt by a small angle relative to surfaces against which they are resting.

The assembly may include a reversal plate that is fixed to the gearbox housing and is located on the side of the first bearing assembly closest to the motor, the reversal plate providing a rigid extension of the gearbox housing onto which the first fulcrum means applies axial loads for the first direction of gearwheel torque. The reversal plate may therefore be the component against which the first end of each of the elements rests. The elements may comprise dowels, being elongate cylindrical elements.

Alternatively, the elements may comprise ball bearings. Indeed, elements of a wide range of different shapes may be used, as long as they are able to provide the function of acting as a fulcrum.

At least one of each pair of elements may be located in a complimentary bore such that the element is free to slide along the bore under certain defined conditions. The elements may be a loose fit in the bore.

The first fulcrum means may be positioned proximate to the face of the first bearing assembly which is closer to the second bearing means and where the second fulcrum means is positioned proximate to the face of the first bearing means which is further from the second bearing means.

The common plane of the pair of elements of the first fulcrum means may be coincidental or close to and substantially parallel to the common plane of the pair of elements of the second fulcrum means.

The common planes of the pairs of element of the first and second fulcrum means may be coincident with or close to a plane which is parallel to both the wormshaft axis and the gearwheel axis and which passes through the nominal contact point of the wormshaft teeth and the gearwheel teeth the said nominal contact point being where the so-called pitch circle diameter of the wormshaft touches the so-called pitch circle diameter of the gearwheel.

The apparatus may include a support means for supporting the wormshaft first bearing outer ring which is rigid with respect to radial forces acting on the first bearing assembly and is flexible in the axial direction so as not to be supportive of axial forces acting on the first bearing assembly. The support means of supporting the first bearing assembly may be flexible with regard to tilting moments acting on the first bearing assembly.

The support means in a most convenient arrangement may comprise a flexible plate, for example of spring steel, having a main portion with a substantially central hole closely fitting over the outer diameter of the outer race of the main bearing assembly and having a leg to each side of the main portion, the legs being substantially parallel to each other and being cantilevered from generally near to two adjacent corners of the main portion in a direction such that they each lie either side of the said main portion. The plate may have a thickness of less than 2 mm.

The first ends of the pair of elements comprising exclusively either the first or the second fulcrum means may be individually resting against a respective one of two separate spring-loaded adjustment means which are mounted to the gearbox housing or to a component which is rigidly attached to the housing and which are automatically able to remove axial free play between the ends of the rods and the surfaces against which they are resting.

Each of said adjustment means may comprise a substantially cylindrical piston which is slideably assembled into a bore in the gearbox housing or in a component which is rigidly attached to the gearbox housing and where the axis of the said bore is at an angle with respect to the axis of the rod which is resting against the said piston and where a generally wedge shaped portion of material has been removed from the said piston such as to create a flat face for the rod to rest against and where the shape of the said wedge of removed material is such that the said flat face is substantially at right angles to the axis of the rod and is of sufficient length to allow the first end of the rod to remain resting against it while the piston moves along the said bore through a distance of several millimetres and where the piston is urged along the bore by a spring in the direction which causes the said flat face to push the rod towards the first bearing and where the combination of the said angle of the bore and the coefficients of friction between the piston and the bore and between the piston and the first end of the rod combine to prevent the piston from being moved against the force of the spring by compressive forces in the rod.

The first ends of the pair of rods comprising exclusively either the first or the second fulcrum means may be individually each resting against a fixed surface which is part of the gearbox housing or is part of a component which is rigidly attached to the gearbox housing. The ends of one or more or all of the rods may be spherically or cylindrically curved.

One or more or all of the elements of the first and second pivoting means may substantially enclosed within complimentary holes in the gearbox housing or in a component which is rigidly attached to the gearbox housing.

Each bearing assembly may comprise an inner ring carrying an inner bearing race, an outer bearing ring carrying an outer bearing race, and a set of bearings. The bearings may comprise ball bearings. The first bearing assembly outer ring may be sandwiched between rigid bearing holders, whereby one end of each of the pairs of elements contacts the outer face of the rigid holders. The axial forces acting through the bearing assemblies' outer ring may be transferred to each of the two bearing element holders by a respective flexible ring located in grooves in the said rigid holders, one of said rings being positioned in contact with either end face of the said bearing's outer ring or in contact with an intermediate component. Each ring may comprise an elastomeric ring.

The cross-sectional area of the grooves in the rigid holders varies circumferentially around the wormshaft axis in such a manner as to allow the resistance to tilting of the first bearing assembly relative to the bearing holders to be less in a first plane which includes the wormshaft axis than in a second plane which also includes the wormshaft axis and is at right angles to the first plane the first plane being also parallel to the axis of the gearwheel. The circumferential variation of the cross-sectional area of the grooves may be obtained by having a chamfer or radius of variable dimensions at one or more edges or corners of the grooves. The circumferential variation of the cross-sectional area of the grooves may be obtained by changing their width and/or their depth. This invention relates to gearbox assemblies for electric power steering assemblies of the worm and wheel type.

BRIEF DESCRIPTION OF THE DRAWINGS

There will now be described, by way of example only, two embodiments of the present invention with reference to and as illustrated in the accompanying drawings of which.

DETAILED DESCRIPTION

Figure 1:
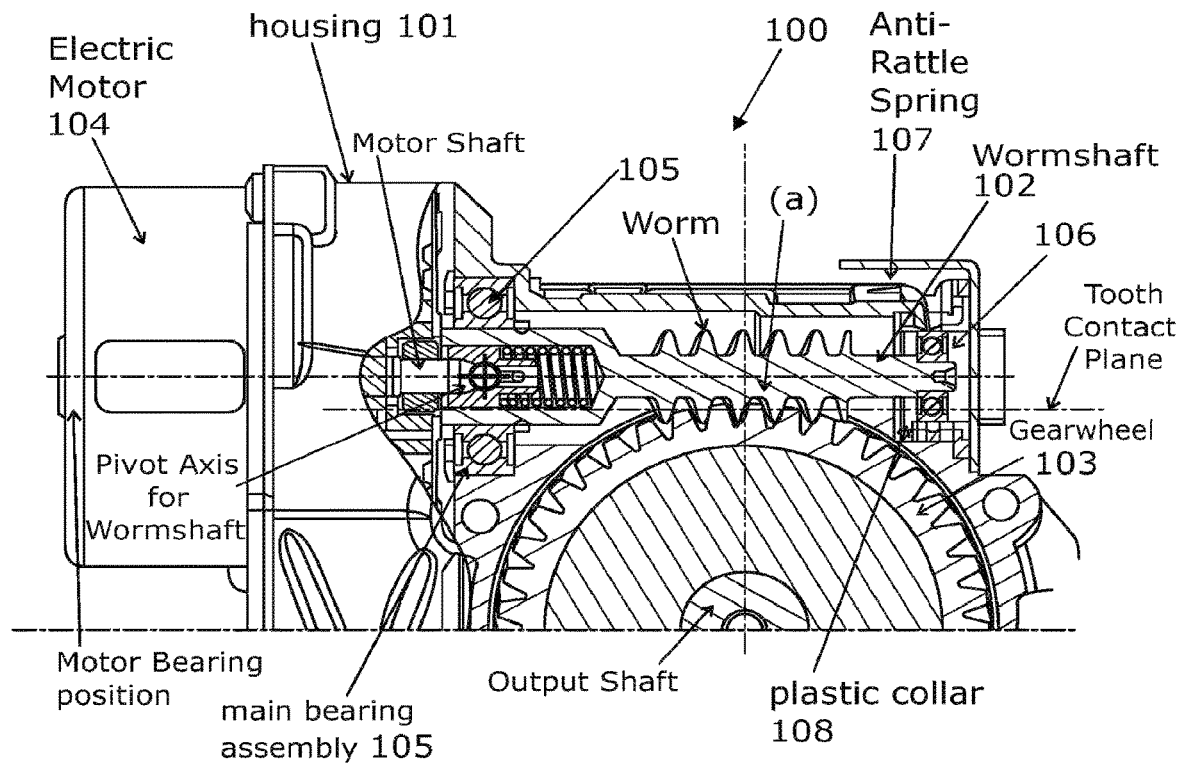
FIG. 1 is a part cross-sectional view of a prior art gearbox assembly for an electric power assisted steering system.
Figure 2:
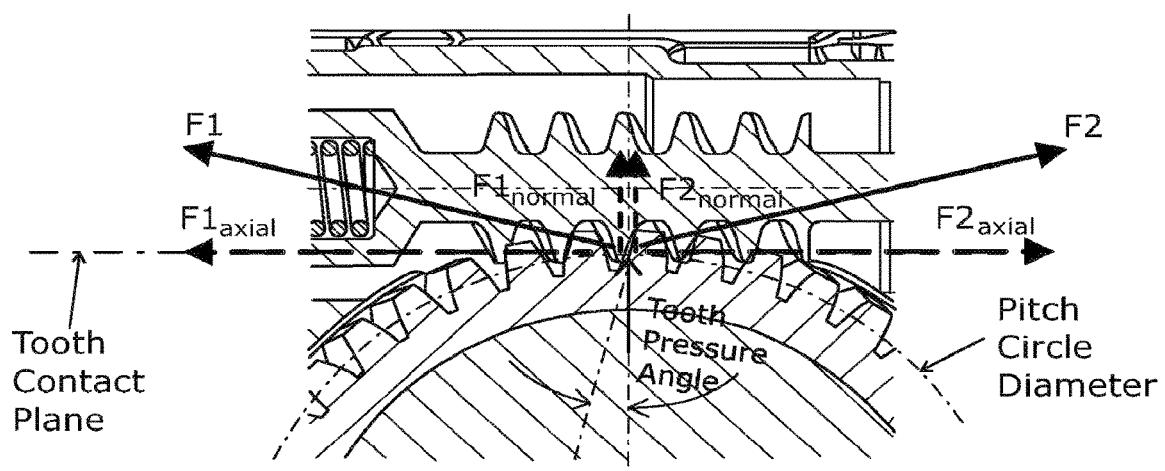
FIG. 2 is an enlarged view of a section of the gearbox assembly of FIG. 1.

FIGS. 3 through 8 show two different embodiments of a gearbox assembly 200 in accordance with an aspect of the Invention that can be incorporated into an electric power assisted steering apparatus. In use the gearbox assembly 200 provides a geared reduction in the output of an electric motor of the steering apparatus, allowing torque generated by the motor to be transferred to the steering column or rack (or other part of the steering system), the torque assisting the driver to turn the wheel or providing the principle source of steering torque.

The gearbox assembly 200 comprises a gearbox housing 8 which houses a worm shaft 15 carrying worm teeth connected to the rotor of an electric motor 204 through a pin 41 and a torque-transmitting coupler 40 The worm shaft 15 comprises an elongate shaft that carries worm teeth. The shaft 15 is supported by a main bearing assembly 105 at the side of the worm that is closest to the motor 204 and by a tail bearing assembly 106 at an end of the shaft 15 furthest from the motor 204. Both bearing assemblies 105, 106 comprise an annular inner race that is threaded onto the shaft 15 so that it cannot move axially along the shaft in use, and an annular outer race supported by the housing 8, with a set of ball bearings connecting the inner race to the outer race. As will be described both the bearing assemblies are able to move, in use, by a small amount relative to the housing 8 as torque is applied to the gearbox assembly 200.

The worm shaft 15 is engaged with a gear wheel 19 that is also housed in the housing. The wheel 19 is supported on an output shaft 206, the two ends of which are accessible from outside of the gearbox. One end of the output shaft is connected to the steering shaft and onwards to the steering wheel (not shown), and the other end of the output shaft is connected to the steering rack and onwards to the road wheels. The output shaft therefore provides a mechanical path directly from the steering wheel to road wheels in this example and the gear wheel transfers torque from the motor to the output shaft to assist the driver.

The gear wheel 19 and worm shaft 15 each have complimentary teeth that are meshed and may be in a single flank contact or double flank contact condition. In the former condition, each worm tooth that is engaged with the worm wheel and each wormwheel tooth that is engaged with the worm, at a given instant in time will contact at only one of its two sides, and in the latter condition at least one worm tooth or one wormwheel tooth will be in contact at both of its sides at a given instant in time.

The main bearing assembly and tail bearing assembly allow some controlled axial movement of the worm shaft 15 and pivoting of the worm shaft. To avoid rattle both bearing assemblies should have minimal free play between the inner and outer races for both radial and axial movement. The manner in which the bearings are supported relative to the housing 8 will now be described.

Figure 3:
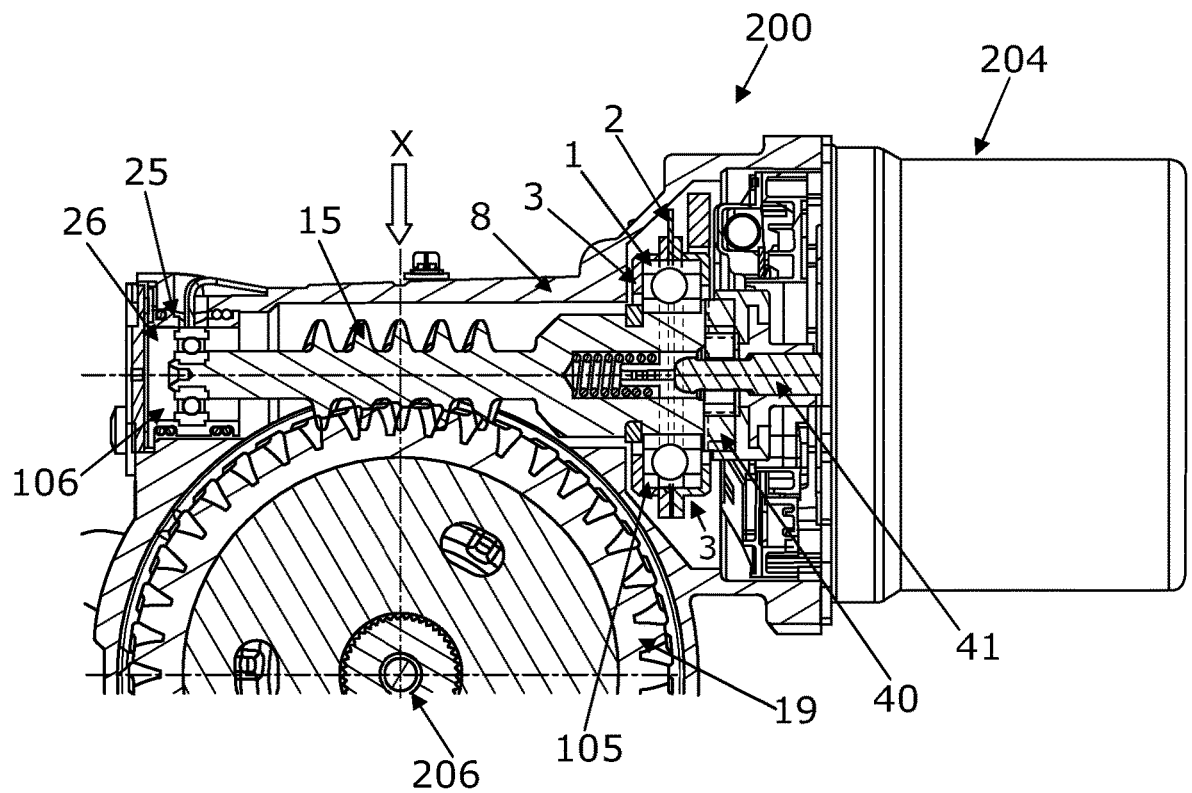
FIG. 3 is a cross-sectional view of a part of a first embodiment of a gearbox assembly in accordance with the present invention.
Figure 4:
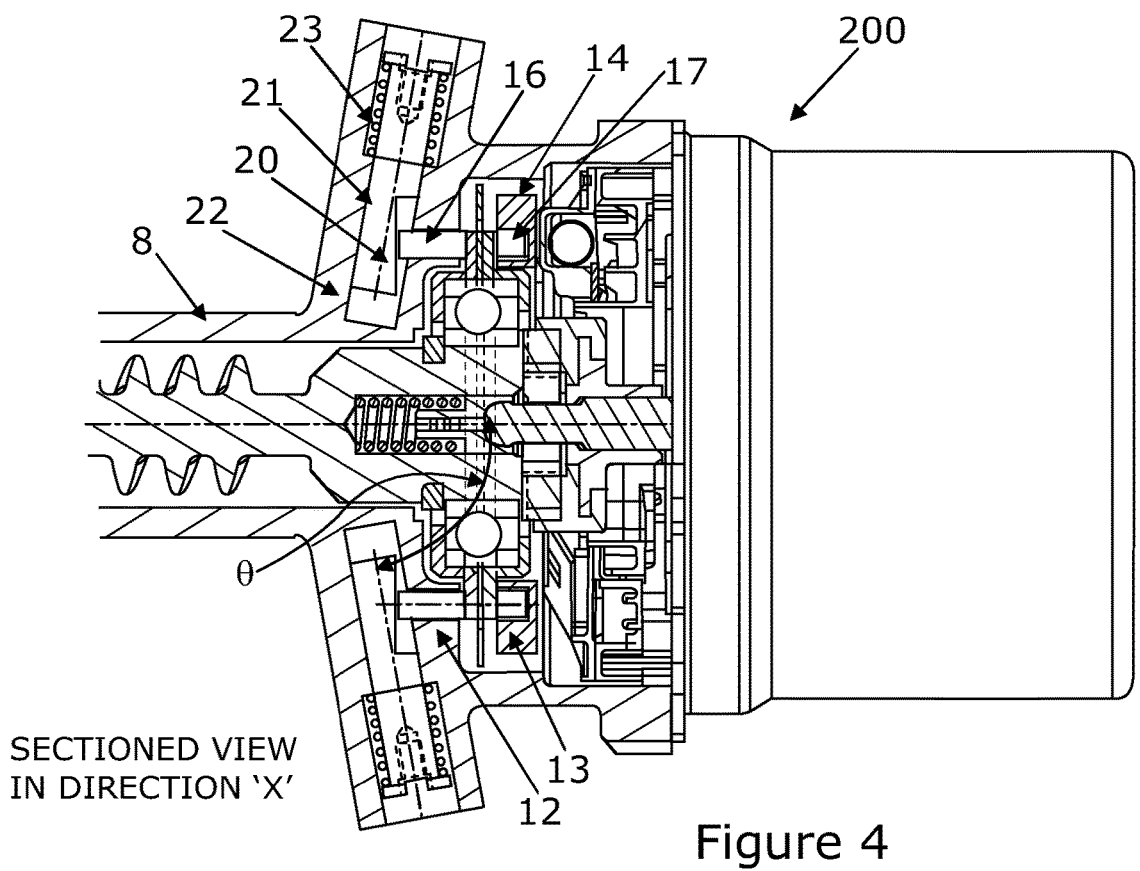
FIG. 4 is a sectioned view in the direction 'X-X' indicated in FIG. 3.
Figure 5:
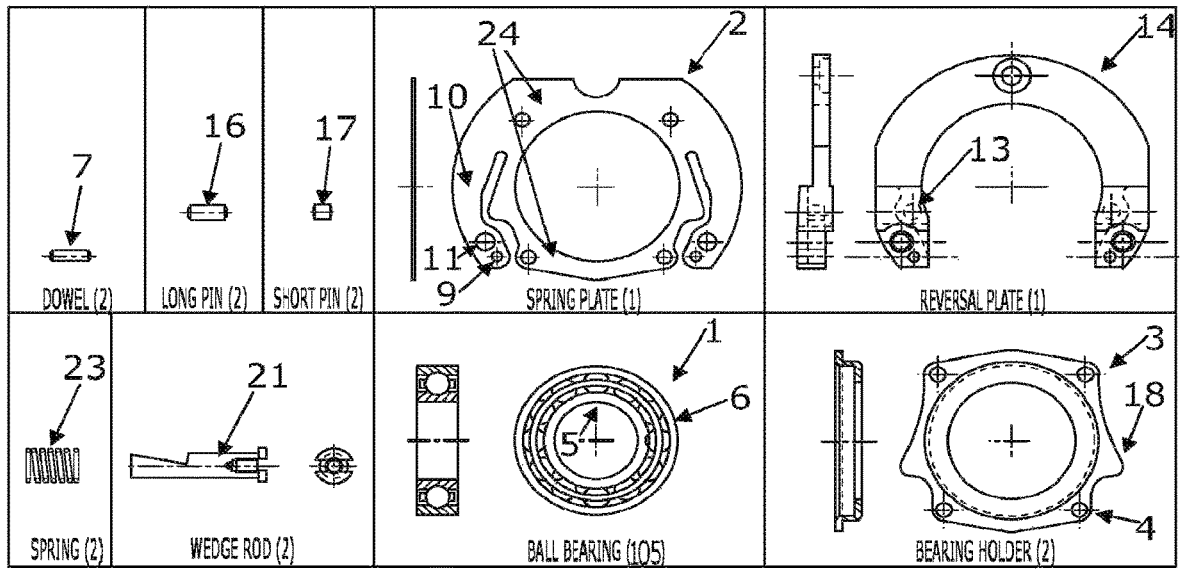
FIG. 5 is a view of several of the key parts of the embodiment shown in FIGS. 3 and 4, prior to installation.

FIGS. 3 and 4 show a first embodiment of the Invention and FIG. 5 shows some of its main components individually for clarity. The outer ring 1 of the main wormshaft ball bearing 105 is mounted into a close fitting central hole in a spring plate 2 and is secured to the spring plate 2 by means of two bearing holders 3, with the spring plate and the ball bearing being sandwiched between them. The sub-assembly of the ball bearing, the spring plate and the bearing holders may be fixed together by four rivets passing through the four holes 4 at the corners of the bearing holders and in the spring plate. Of course the outer race, plate and bearing holders call all be integrally formed as one item but this would prevent off the shelf bearing assemblies being used.

The ball bearing assembly should have minimal internal clearance between the balls and the race-grooves so as to virtually eliminate axial free play between its inner and outer rings 5, 6. The ball bearing assembly may be of the deep-groove type or of the 4-point contact type. The sub-assembly of the ball bearing assembly, the two bearing holders and the spring plate 2 is accurately positioned in the gearbox housing 8 by two dowels 7 which locate the spring plate relative to the housing via the lower hole 9 in each of its vertical leas 10. The spring plate is secured to the housing by two screws which pass through the second lowest hole 11 in each of the said vertical legs. These screws are also used to secure a so-called reversal plate 14 to the housing 8 with the spring plate 2 trapped between them. The reversal plate in effect forms a rigid part of the housing that is located on the side of the bearing assembly closest to the motor in this example, transferring any forces applied to the reversal plate directly to the housing.

The axial forces acting on the wormshaft are transmitted to the housing 8 by passing first through the inner race of the main bearing assembly, then the bearings, and then onto the outer race. Axial forces on the outer race in turn act upon one or other of the two bearing holders (depending on the direction of the axial force) and this axial force applied to the bearing holders is applied onto two pairs of coaxial pins, one pin of each pair being located on the opposite side of the spring plate so that the spring plate is pinched between the two pins of each pair in the manner of pinching the plate between the thumb and forefinger of each hand. The pins are respectively inserted into holes 12, 13 in the housing 8 on the side of the main bearing facing away from the motor and in the reversal plate 14. One of each pair of pins may be longer than the other.

By contacting flanges 18 of one of the bearing holders, those pins inserted in the housing, which may be the longer pins 16, react the axial forces acting on the wormshaft 15 which are due to a first direction of gearbox torque. Those pins 17 inserted in the reversal plate, which may be the shorter pins, react the axial forces which are due to the opposite direction of gearbox torque.

The points of contact of the pins with the bearing holders define the respective axes around which the bearing must pivot if the wormshaft is urged into or out of mesh with the gearwheel 19. Both pairs of pins may have their axes positioned in the gear tooth contact plane and parallel to axis of the wormshaft and therefore the pivoting axes also lie in the same said plane. Theoretically, choosing this positioning for the pins minimises any asymmetry in gearbox friction torque with respect to the two directions of rotation of the gearbox.

The spring plate 2 is not intended to resist the axial forces acting on the wormshaft. It is shaped so as to provide minimal resistance to the pivoting of the wormshaft and to allow small axial movements at the ball bearing centre. This is because, as the central portion 24 of the spring plate pivots or displaces axially, the legs 10 are easily able to deflect normal to their natural plane, adopting shapes having either single or multiple curvature. The spring plate behaves rigidly only with respect to the radial forces acting on the main bearing. Those radial forces which are due to the tooth pressure angle are resisted mainly by the tensile stiffness of the legs and those forces which are due to the helix angle of the teeth are resisted mainly by the bending stiffness of the legs within their own plane.

The holes into which the said pins are inserted are sufficiently oversized in diameter to allow the pins to rock slightly about their ends so that any small movements of the bearing holders normal to the axes of the pins can be accommodated without the ends of the pins having to slide. The ends of the pins may be domed to assist this rocking motion.

To ensure the pins pinch tightly onto the bearing holders at all times, one end of each of the two pins 16 which are inserted in the gearbox housing rests against an angled flat face 20 on a so-called wedge element 21. Each of the two said wedge elements is a slide fit in a bore 22 in the gearbox housing 8. Each said bore is inclined by a large angle θ relative to the wormshaft axis. The angle of each said flat face 20, relative to the axis of its wedge element, may be chosen such that, once installed, the plane of the flat faces is substantially normal to the wormshaft axis. Each wedge element is urged along its bore by a spring 23 which acts in the direction which causes the associated pin 16 to be urged towards the bearing holders. The function of the sprung wedge elements is to automatically prevent any axial clearances arising at the ends of the any of the pins, whether due to dimensional tolerances, wear, temperature effects, etc. Such clearances might cause rattle noise. The combination of the angle of inclination θ of the said bores 22, relative to the wormshaft axis, and the sliding coefficient of friction between the wedge rods and the surface of the said bore, is designed to prevent axial forces in the pins from moving the wedge rods counter to the force of the springs. In other words, the wedge elements are not back-driveable by the pins.

FIG. 4 shows both wedge elements 21 lying in a common plane. However, their axes may individually be rotated about the axes of their respective pin pairs 16, 17—and therefore out of the plane of the cross-section shown in FIG. 4—without affecting their function. Rotating the wedge rods in this manner may have advantages for packaging the gearbox housing within the space allowed in specific vehicle types.

Figure 6:
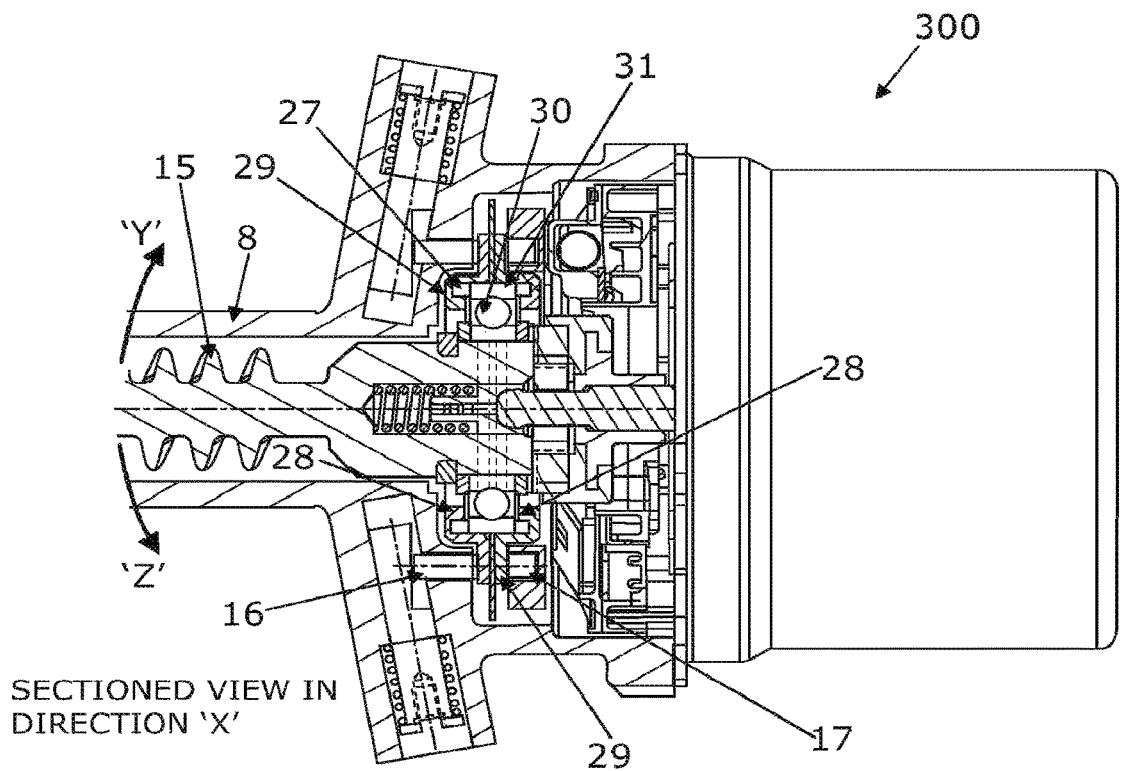
FIG. 6 is a cross-sectional view of a part of a second embodiment of a gearbox assembly in accordance with the present invention, the view corresponding with the view of FIG. 3.
Figure 7:
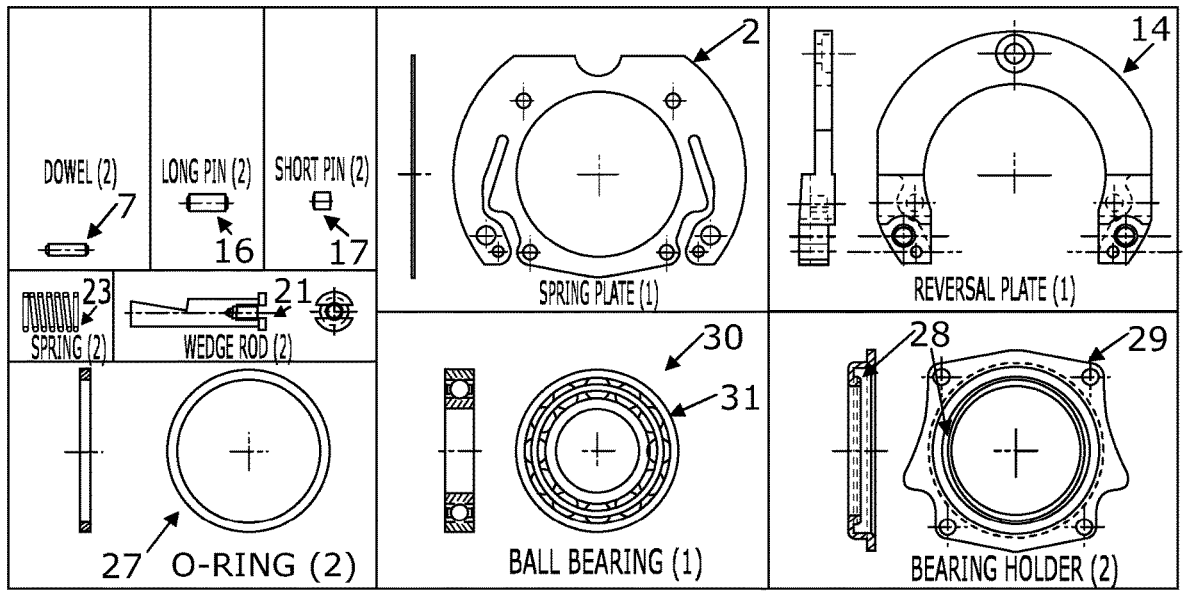
FIG. 7 is a view of several of the key parts of the embodiment shown in FIG. 6, prior to installation.

FIG. 6 shows a second embodiment of a gearbox assembly 300 within the scope of an aspect of the present invention and FIG. 7 shows some of its main components individually for clarity.

Where the same components are present in both the first and second embodiments the same reference numerals have been used for clarity and the description above may be used to determine the function of those components. This second embodiment differs from the first by the addition of elastomeric O-rings 27 for holding the ball bearing 30 axially central between the two bearing holders 29. The O-rings may be of rectangular cross-section. A ball bearing of reduced overall width may be advantageous in realising this second embodiment within the same packaging space as the first. The more compliant axial retention of the ball bearing allows it, and hence the wormshaft, to tilt by small angles relative to the bearing holders when radial loads are applied at the wormshaft tail bearing 25 in directions normal to the cross-section drawn in FIG. 3. The said small angles correspond to the arrows 'X' and 'Y' in FIG. 6. Without this added compliance, resistance to deflections of the tail bearing in the said direction is high due to the rigidity of the bearing 1, the pins 16, 17 and the bearing holders 3 (see FIG. 4). Without the O-rings, this rigidity can be disadvantageous when trying to align the tail bearing with its supporting bore 26.

Another advantage of locating the bearing by the O-rings is to alleviate the need for having a high manufacturing accuracy for the depth of the internal bearing holders. It should be noted that, in the arrangement of FIG. 5, oversizing the said depth could allow the ball bearing to shuttle between the bearing holders and cause rattle. Under-sizing the said dimension could cause the bearing's outer race 6 to be heavily squeezed when the bearing holders are fastened together, resulting in an increase in the bearing's rotational friction.

Figure 8:
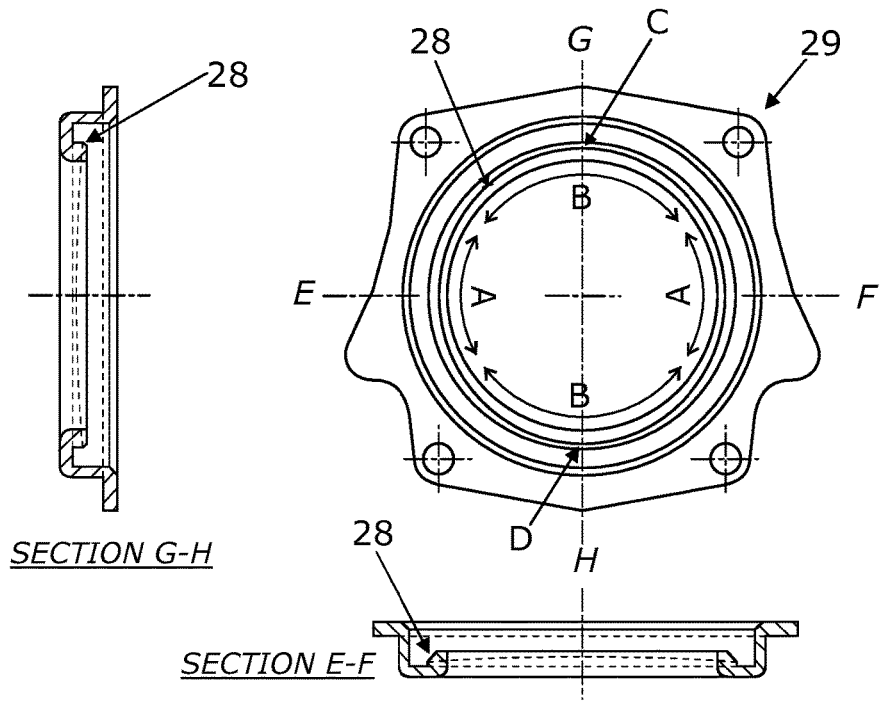
FIG. 8 is an enlarged view and sectional view of the bearing holder of the second embodiment.

The applicant has appreciated that any axial deflection of the wormshaft at high gearbox torques in the second embodiment can be minimized, while retaining the desired ability of the wormshaft to deflect in the said directions 'X' and 'Y', by providing significantly more space in the regions 'A' as shown in FIG. 8 into which the O-ring material can deflect under pressure than in the regions 'B'. Ensuring that the O-ring material is more highly contained in the regions 'B' effectively creates a "hinge" axis through points 'C' and 'D' whereby the ball bearing cannot easily deflect when loaded purely axially but it can rotate in directions 'X' and 'Y' about the said "hinge" axis because the O-ring material in the regions 'A' is more easily deflected.

One economical means of achieving a circumferential variation in the space into which the O-ring material can deflect, is to incorporate a variable depth chamfer 28 as shown in FIG. 8. Such geometry may be simply manufactured by side-shifting a rotating chamfering tool in the direction of the axis connecting 'E' to 'F'.

The invention claimed is:

1. A gearbox assembly for an electric power assisted steering apparatus comprising:
a gearbox housing which houses a wormshaft carrying a worm gear and a gear wheel having a set of gearwheel teeth,
the worm shaft being supported relative to the housing by a main bearing assembly at an end closest to the motor and by a tail bearing assembly at an end furthest from the motor, and the gear wheel being supported by an output shaft having at least one end that provides a take-off from the gearbox assembly,
the main bearing assembly comprising an inner ring defining an inner bearing race, an outer ring defining an outer bearing race, and a plurality of bearings that run between the two races, the inner bearing race being fixed to the wormshaft such that it cannot move axially relative to the wormshaft,
the assembly being arranged such that the wormshaft is capable of pivoting about an axis or axes proximate to the main bearing assembly so as to enable dual-sided tooth flank contact of the teeth of the worm with the gearwheel teeth to be achieved,
further comprising a first fulcrum means located on a first side of the main bearing assembly which reacts only the axial component of the wormshaft tooth load for a first direction of gearwheel torque and a second fulcrum means located on a second, opposing, side of the main bearing assembly, which reacts only the axial component of the wormshaft tooth load for the second direction of gearwheel torque, the points of contact of the first and second fulcrums with the main bearing assembly defining an axis around which the main bearing assembly may pivot.

2. The gearbox assembly according to claim 1, in which the first fulcrum means may comprise a pair of rigid elements each having an axis substantially parallel to the wormshaft axis and two opposed regions located at each end of the axes defining ends of the element, the elements being positioned substantially equidistant either side of the wormshaft axis in a common plane which is parallel with the axes of both the wormshaft and the gearwheel and where a first end of each element is resting against the gearbox housing or a component which is connected to the gearbox housing and the second end of each element is resting against the outer race of the first bearing assembly or against a component which is connected to the outer race of the first bearing assembly and where the first and second ends of each elements are able to tilt by a small angle relative to surfaces against which they are resting.

3. The gearbox assembly according to claim 1, in which the second fulcrum means comprises a pair of elements having their axes substantially parallel to the wormshaft axis the elements being positioned substantially equidistant either side of the wormshaft axis in a common plane which is parallel with the axes of both the wormshaft and the gearwheel and a first end of each element is resting against the gearbox housing or a component which is connected to the gearbox housing and the second end of each element is resting against the outer ring of the first bearing or against a component which is connected to the outer ring of the first bearing and where the first and second ends of each element are able to tilt by a small angle relative to surfaces against which they are resting.

4. The gearbox assembly according to claim 2, which includes a reversal plate that is fixed to the gearbox housing and is located on the side of the first bearing assembly closest to the motor, the reversal plate providing a rigid extension of the gearbox housing onto which the first fulcrum means applies axial loads for the first direction of gearwheel torque.

5. The gearbox assembly according to claim 2, in which each of the elements comprises a dowel or a ball bearing.

6. The gearbox assembly according to claim 2, in which at least one of each pair of elements is located in a complimentary bore such that the element is free to slide along the bore under certain defined conditions.

7. The gearbox assembly according to claim 2, in which the first fulcrum means is positioned proximate to the face of the first bearing assembly which is closer to the second bearing means and where the second fulcrum means is positioned proximate to the face of the first bearing means which is further from the second bearing means.

8. The gearbox assembly according to claim 2, in which the common plane of the pair of elements of the first fulcrum means is coincidental or close to and substantially parallel to the common plane of the pair of elements of the second fulcrum means.

9. The gearbox assembly according to according to claim 2, in which the common planes of the pairs of element of the first and second fulcrum means are coincident with or close to a plane which is parallel to both the wormshaft axis and the gearwheel axis and which passes through the nominal contact point of the wormshaft teeth and the gearwheel teeth the said nominal contact point being where the so-called pitch circle diameter of the wormshaft touches the so-called pitch circle diameter of the gearwheel.

10. The gearbox assembly according to claim 2, in which the apparatus includes a support means for supporting the wormshaft first bearing outer ring which is rigid with respect to radial forces acting on the first bearing assembly and is flexible in the axial direction so as not to be supportive of axial forces acting on the first bearing assembly.

11. The gearbox assembly according to claim 10, in which the support means of supporting the first bearing assembly is flexible with regard to tilting moments acting on the first bearing assembly.

12. The gearbox assembly according to claim 11, in which the support means comprises a flexible plate having a main portion with a substantially central hole closely fitting over the outer diameter of the outer race of the main bearing assembly and having a leg to each side of the main portion, the legs being substantially parallel to each other and being cantilevered from generally near to two adjacent corners of the main portion in a direction such that they each lie either side of the said main portion.

13. The gearbox assembly according to claim 2, in which the first ends of the pair of elements comprising exclusively either the first or the second fulcrum means are individually resting against a respective one of two separate spring-loaded adjustment means which are mounted to the gearbox housing or to a component which is rigidly attached to the housing and which are automatically able to remove axial free play between the ends of the elements and the surfaces against which they are resting.

14. The gearbox assembly according to claim 13, in which each of said adjustment means comprise a substantially cylindrical piston which is slideably assembled into a bore in the gearbox housing or in a component which is rigidly attached to the gearbox housing and where the axis of the said bore is at an angle with respect to the axis of the element which is resting against the said piston and where a generally wedge shaped portion of material has been removed from the said piston such as to create a flat face for the element to rest against and where the shape of the said wedge of removed material is such that the said flat face is substantially at right angles to the axis of the element and is of sufficient length to allow the first end of the element to remain resting against it while the piston moves along the said bore through a distance of several millimetres and where the piston is urged along the bore by a spring in the direction which causes the said flat face to push the element towards the first bearing and where the combination of the said angle of the bore and the coefficients of friction between the piston and the bore and between the piston and the first end of the element combine to prevent the piston from being moved against the force of the spring by compressive forces in the element.

15. The gearbox assembly according to claim 13, in which the first ends of the pair of elements comprising exclusively either the first or the second fulcrum means are individually each resting against a fixed surface which is part of the gearbox housing or is part of a component which is rigidly attached to the gearbox housing.

16. The gearbox assembly according to claim 15, in which the ends of one or more or all of the elements are spherically or cylindrically curved.

17. The gearbox assembly according to claim 2, in which one or more or all of the elements of the first and second pivoting means are substantially enclosed within complimentary holes in the gearbox housing or in a component which is rigidly attached to the gearbox housing.

18. The gearbox assembly according to claim 2, in which each bearing assembly comprises an inner ring carrying an inner bearing race, an outer bearing ring carrying an outer bearing race, and a set of bearings.

19. The gearbox assembly according to claim 18, in which the first bearing assembly outer ring is sandwiched between rigid bearing holders, whereby one end of each of the pairs of elements contact the outer face of the rigid holders.

20. The gearbox assembly according to claim 19, in which the axial forces acting through the bearing assemblies' outer ring are transferred to each of the two bearing element holders by a respective flexible ring located in grooves in the said rigid holders one of said rings being positioned in contact with either end face of the said bearing's outer ring or in contact with an intermediate component.

\* \* \* \* \*